United States Patent
Dalvi et al.

(10) Patent No.: US 8,762,829 B2
(45) Date of Patent: Jun. 24, 2014

(54) ROBUST WRAPPERS FOR WEB EXTRACTION

(75) Inventors: Nilesh Dalvi, Menlo Park, CA (US); Philip Bohannon, Cupertino, CA (US); Fei Sha, Arcadia, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1174 days.

(21) Appl. No.: 12/344,076

(22) Filed: Dec. 24, 2008

(65) Prior Publication Data

US 2010/0162097 A1 Jun. 24, 2010

(51) Int. Cl.
*G06F 17/22* (2006.01)

(52) U.S. Cl.
CPC .................... *G06F 17/2247* (2013.01)
USPC .......................... 715/234; 707/811

(58) Field of Classification Search
CPC .................................... G06F 17/2247
USPC .................... 707/661, 811; 715/234
See application file for complete search history.

(56) References Cited

U.S. PATENT DOCUMENTS

| | | | | |
|---|---|---|---|---|
| 6,366,933 | B1 * | 4/2002 | Ball et al. | 715/203 |
| 6,516,308 | B1 * | 2/2003 | Cohen | 706/12 |
| 7,669,119 | B1 * | 2/2010 | Orelind et al. | 715/234 |
| 7,954,053 | B2 * | 5/2011 | Orelind et al. | 715/234 |
| 2004/0015784 | A1 * | 1/2004 | Chidlovskii | 715/530 |
| 2008/0104502 | A1 * | 5/2008 | Olston | 715/229 |
| 2011/0191381 | A1 * | 8/2011 | Zheng et al. | 707/793 |

OTHER PUBLICATIONS

Reis, Davi de Castro et al. "Automatic Web News Extraction Using Tree Edit Distance", May 17, 2004, Association for Computing Machinery.*
Lerman, Kristina et al. "Wrapper Maintenance: A Machine Learning Approach" Feb. 2003, AI Access Foundation.*
Abe et al. "Robust Pointing by xpath language: Authoring support and empirical evaluation." Applications and the Internet, IEEE/IPSJ International Symposium on, 0:156, 2003.
Anton, Tobias. "Xpath-wrapper induction by generating tree traversal patterns." LWA, pp. 126-133, 2005.
Baumgartner et al. "Visual Web Information Extraction with Lixto." VLDB, pp. 119-128, 2001.
Bernard et al. "Learning stochastic tree edit distance." ECML, pp. 42-53, 2006.
Bille, Philip. "A survey on tree edit distance and related problems." Theor. Comput. Sci., 337(1-3):217-239.
Boyer et al. "Learning metrics between tree structured data: Application to image recognition." ECML, pp. 54-66, 2007.
Chidlovski et al. "Documentum eci self-repairing wrappers: performance analysis." SIGMOD '06: Proceedings of the 2006 ACM SIGMOD international conference on Management of data, pp. 708-717, New York, NY, USA, 2006. ACM.

(Continued)

*Primary Examiner* — Cesar Paula
*Assistant Examiner* — Tyler J Schallhorn
(74) *Attorney, Agent, or Firm* — Weaver Austin Villeneuve & Sampson LLP

(57) ABSTRACT

A computer-implemented method to determine a robust wrapper includes developing a model indicative of the temporal history of a document, such as a web document written in a markup language. Based on the developed model, robustness characteristics are determined for a plurality of different wrappers representing associated paths to the data item in a representation of the document. Based on a result of the determining operation, a result wrapper of the plurality of wrappers is provided. The result wrapper has a desired robustness characteristic.

19 Claims, 4 Drawing Sheets

(56) References Cited

OTHER PUBLICATIONS

Cohen et al. "A flexible learning system for wrapping tables and lists in html documents." WWW '02: Proceedings of the 11th international conference on World Wide Web, pp. 232-241, New York, NY, USA, 2002. ACM.

Crescenzi et al. "Roadrunner: Towards automatic data extraction from large web sites." VLDB, pp. 109-118, 2001.

Graehl et al. "Training tree transducers." HLT-NAACL, pp. 105-112, 2004.

Han et al. "Wrapping web data into XML." SIGMOD Record, 30(3):33-38, 2001.

Hsu et al. "Generating finite-state transducers for semi-structured data extraction from the web." Information Systems, 23(8):521-538, 1998.

Knight et al. "An overview of probabilistic tree transducers for natural language processing." Proceedings of the CICLing, 2005.

Kowalkiewicz et al. "Robust web content extraction." WWW '06: Proceedings of the 15th international conference of World Wide Web, pp. 887-888, New York, NY, USA, 2006. ACM.

Kushmerick et al. "Wrapper induction for information extraction." IJCAI, pp. 729-737, 1997.

McCallum et al. "A conditional random field for discriminatively-trained finite-state string edit distance." UAI, 2005.

Myllymaki et al. "Robust web data exteraction with xml path expressions." Technical report, IBM Research Report RJ 10245, May 2002.

Oncina et al. "Learning stochastic edit distance: Application in handwritten character recognition." Pattern Recogn., 39(9)1575-1587, 2006.

Ristad et al. "Learning string edit distance." ICML, pp. 287-295, 1997.

Sahuguet et al. "Building light-weight wrappers for legacy web datasources using w4f." VLDB, pp. 738-741, 1999.

\* cited by examiner

ROBUST WRAPPERS FOR WEB EXTRACTION

BACKGROUND

Many companies selectively extract data from web documents. For example, a typical shopping comparison web service obtains desirable information, such as product names, model numbers, and prices, from the web pages of various online retailers. The shopping comparison service will then reorganize and list this information so that its visitors may easily compare the pricing of similar products by multiple vendors.

Such functionality requires a reliable means of finding desired information in web documents with different structures. The structure of a web document can be represented as an XML document tree. FIG. 1 displays a simplified example of such a tree 100. Tree 100 pertains to a web page for a site that may be classified as being about a movie or movies. Information can be extracted from tree 100 by referring to nodes in the tree structure. For instance, to extract the director name from tree 100, we can use the following XPath expression, $$W_1 = /html/body/div [2]/table/td[2]/text( ) \qquad (1)$$

which specifies how to traverse trees having a structure similar to tree 100. In particular, the XPath expression $W_1$ above starts from the root, follows the tags html, body, the second div under body, the table under the second div, the second td under table and then the text( ) under the second td. The path expression $W_1$ is often called a wrapper.

While the conventional use of wrappers is an effective way to extract information, it suffers from a fundamental problem: the underlying web pages frequently change, often very slightly, which may cause the wrapper to "break" i.e., the path of the wrapper no longer leads to the desired data item in a web page. As a result, a new wrapper must be learned to accommodate the changes in the web page. For instance, consider the wrapper $W_1$ above. It breaks if the structure of tree 100 changes in any of the following ways: a new div section gets added before the content section, or the first div is deleted or merged with the second div, a new table or tr is added under the second div, and so on. Websites are constantly going through small edits and thus the breaking of wrappers is often a problem.

SUMMARY

Various aspects of the present invention provide methods for determining a robust wrapper. One aspect is directed to developing a model based on the archival data of a web document. The archival data provides a history of how the web document has changed in the past, thus providing insight into the ways in which the web document may change in the future. Particular embodiments of the model takes into account possible future versions of the web document, the change operations that lead to such versions, and the probability of each change operation. Based on the model, robustness characteristics are determined for various wrappers. Each wrapper, for example, may be tested to see if it can locate a data item in a representation of a web document that has been subjected to various change operations. A wrapper with the desired robustness characteristic is then provided.

BRIEF DESCRIPTION OF THE DRAWINGS

The invention and the advantages thereof, may best be understood by reference to the following description taken in conjunction with the accompanying drawings in which.

In the drawings, like reference numerals are sometimes used to designate like structural elements. It should also be appreciated that the depictions in the figures are diagrammatic and not to scale.

DETAILED DESCRIPTION

As noted in the Background of the Invention, wrappers are effective in certain applications, but sometimes break when the underlying web documents are changed. As a result, substantial time and resources can be consumed in detecting and updating failed wrappers.

Particular embodiments of the present invention address this problem. The inventors have developed a model that characterizes the robustness of a wrapper. The model takes into account both the kinds of changes that a web document may undergo as well as the probability of each change. As a result, wrappers may be selected that have the least expected failure. One way of representing such wrappers is as follows:

$$W_S^* = \underset{W \in W_S}{\mathrm{argmax}} \sum_T succ(W, T) P_S(T) \qquad (1)$$

where $W_S$ is the set of candidate wrappers learned on the current tree S, $P_S(T)$ is the probability of the current tree S getting modified to tree T and the predicate succ is 1 if the wrapper W can successfully extract information from T.

Figure 2:
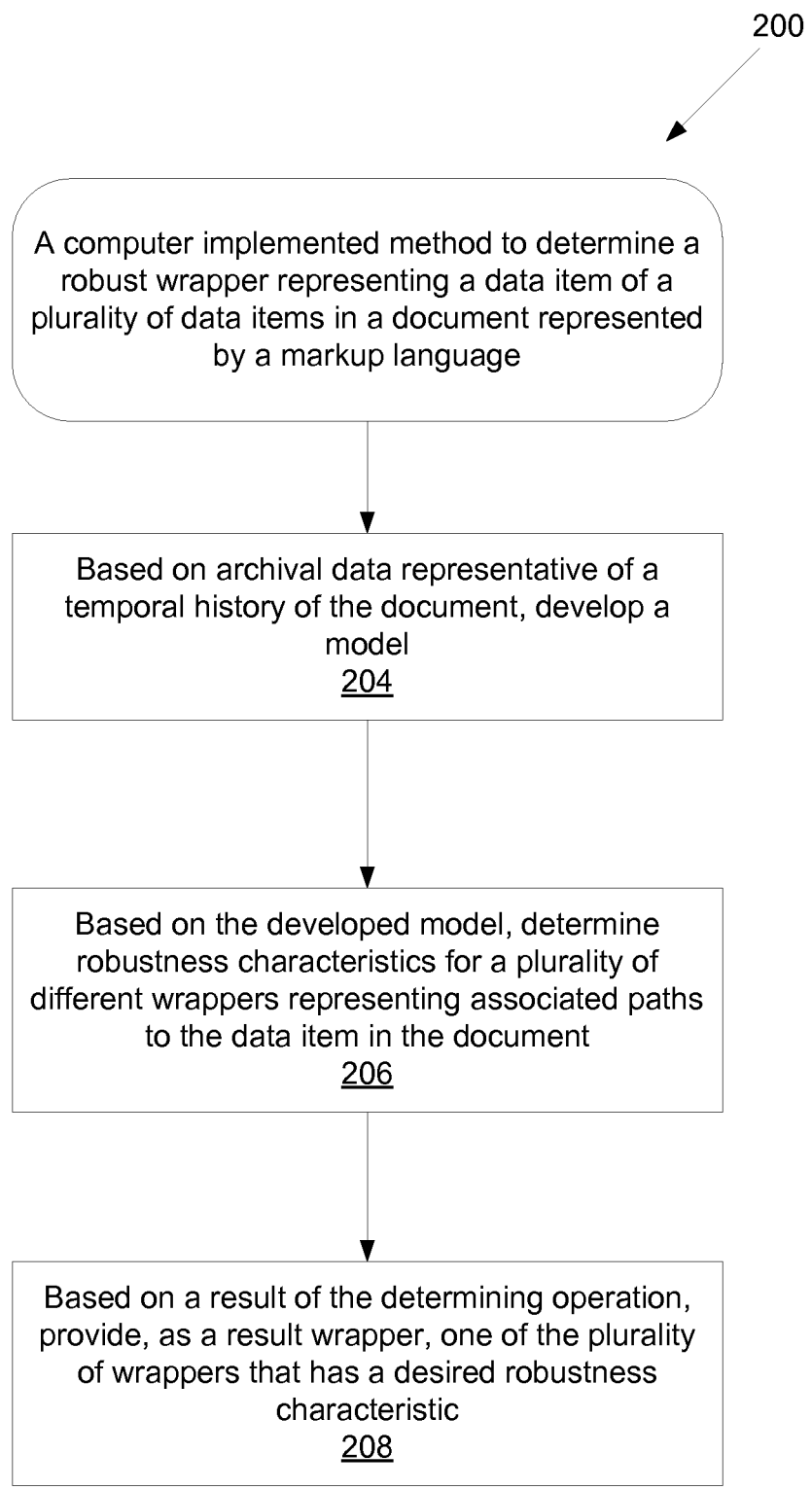
FIG. 2 is a flowchart that broadly illustrates a computer-implemented method to determine a robust wrapper.
Figure 3:
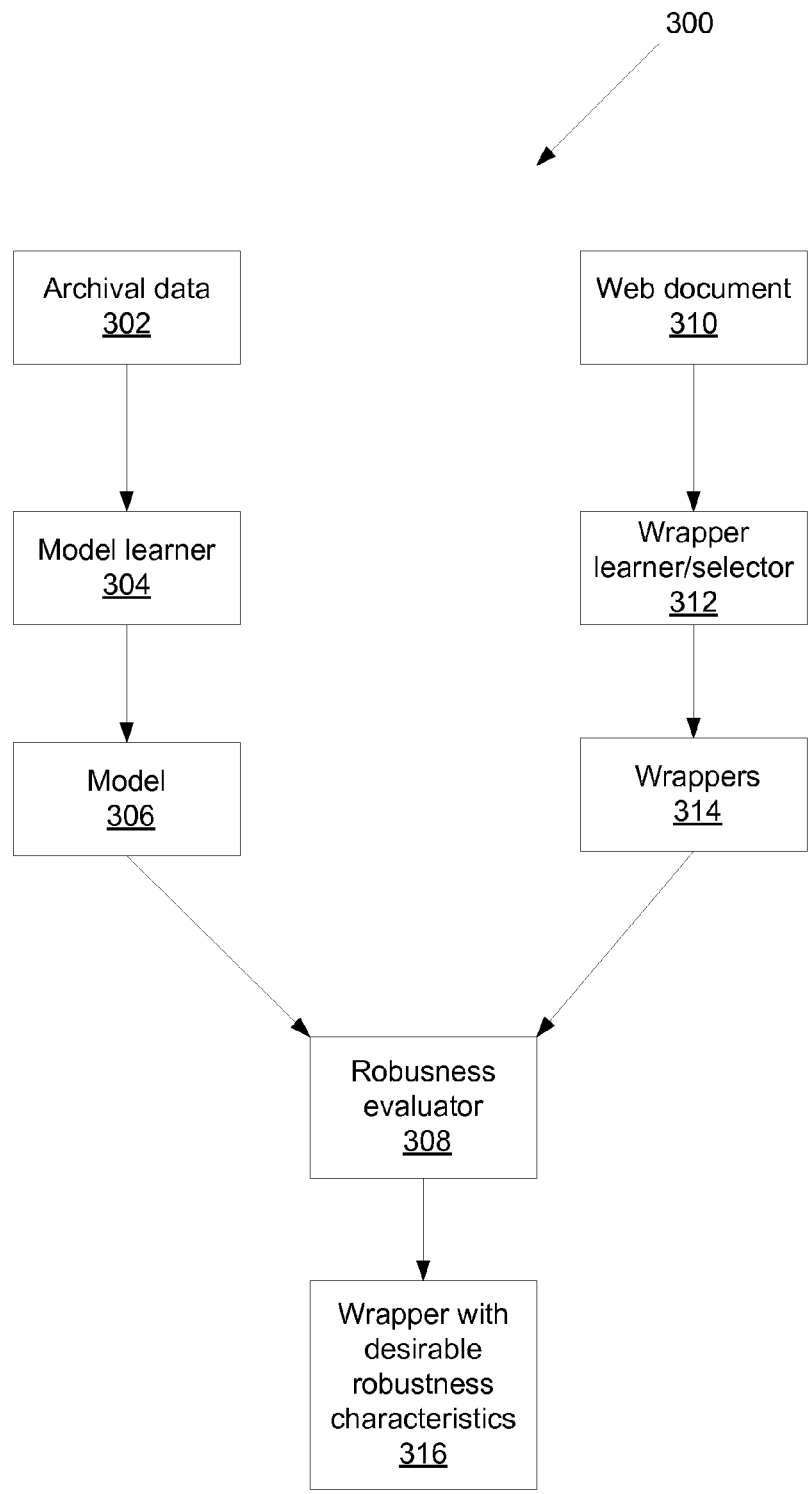
FIG. 3 is a block diagram illustrating the method of FIG. 2.

One embodiment of the present invention is illustrated in FIGS. 2 and 3. FIG. 2 depicts steps in a method for determining a robust wrapper. FIG. 3 depicts components that may be involved with such steps. The components include web document 310, archival data 302, model learner 304, wrapper learner/selector 312 and robustness evaluator 308. These components help generate a wrapper with desirable robustness characteristics 316. The wrapper 316 is adapted to reliably provide a path to a data item in a representation of the web document 310, even after various changes have been applied to the web document 310.

Web document 310 may refer to any kind of file or data found on a network and/or the Internet. In the illustrated embodiment, web document 310 is a web page represented in Extensible Markup Language (XML). Archival data 302 indicates changes made to web document 310 during one or more periods of time in the temporal history of web document 310. Archival data 302 may be understood as a set of documents including an original web document and multiple changed documents that are altered versions of the original web document, or other representations of the original web document and the multiple changed documents.

Model learner 304 develops a model 306 based on archival data 302 (step 204 of FIG. 2). For the purposes of understanding model 306, we further define XML web document 310. Let N be the set of nodes which is infinite so as to accommodate arbitrarily large documents. Let Σ denote a finite set of labels. An XML document T is an ordered tree with nodes from N along with a function L that maps nodes of T to elements from Σ.

Model learner 304 performs various operations to generate model 306. Model learner 304 may identify an original tree in archival data 302. Model learner 304 also may identify multiple trees that the original tree changed into. We refer to this latter group of trees as "changed trees." Model learner 304 defines various kinds of change operations. The change operations, for example, may relate to the insertion, deletion and/or changing of a node. Additionally, model learner 304 can look at all possible change operations that could lead to the changed trees. Fourth, model learner 304 can assign probabilities to each change operation.

Model 306 is based on the idea that web document 310 may undergo multiple, generally small changes over time. These changes reflect updates to either information (adding, removing or editing) or stylistic elements such as font change. In either case, the tree structures of the new documents are different from old ones, identifiable by adding and removing subtrees, changing node labels, etc. Note that what kinds of changes to be made at any given time need not be deterministic, not only varying among websites but also varying among types of contents.

For the purposes of clarifying a particular embodiment of the present invention, we characterize the stochastic process that changes a tree S and generates a new tree T with a memoryless transducer. We begin describing this transducer in details in below, followed by a discussion on the inference problem in the transducer.

While we are interested in XML tree structures, we find that it is more convenient to describe the stochastic process of tree changes in the more general term of "forests," with each forest relating to a set of one or more trees We propose to characterize the stochastic process that changes a tree S and generates a new tree T with a memoryless transducer. We begin describing this transducer in details in below, followed by a discussion on the inference problem in the transducer.

Let $\pi$ be the process of changing a forest F to another forest G. The process $\pi$ is defined recursively using two subprocesses $\pi_{ins}$ and $\pi_{ds}$ as follows.

Let $F_1, F_2, \ldots, F_K$ be the trees in F. Then $$\pi(F) = \pi_{ins}(\pi_{ds}(F_1) \ldots \pi_{ds}(F_k)) \quad (2)$$

where $\pi_{ins}$ recursively maps a forest U to another forest V $$\pi_{ins} = \begin{cases} U & \text{with probability } p_{stop} \\ \pi_{ins}(e_1(U)) & \text{with the rest probability} \end{cases}$$

where $e_1(U)$ is an insert operation that adds a node at the top of U chosen randomly from all such operations. Specifically, $e_1(U)$ first chooses randomly a label $l \in \Sigma$ with probability $p_{ins}(l)$ and creates a new node. Then it chooses uniformly a random subsequence of $[1 \ldots K]$ as children of the new node. Furthermore, the probability $p_{ins}(l)$ is normalized $$\sum_{l \in \Sigma} p_{ins}(l) = 1.$$

The operator $\pi_{ds}$ maps a tree S to a forest. It either deletes or substitutes the root of the tree and recursively transforms the subtrees of the tree S. Given a tree S with root s, we have $$\pi_{ds} = \begin{cases} \pi(\lfloor s \rfloor) & \text{with probability } p_{del}(L(s)) \\ e_2(\pi\lfloor s \rfloor)) & \text{with the rest probability} \end{cases}$$

where $e_2(U)$ is an insertion operation that creates a new root node whose children are all trees returned by $\pi(\lfloor s \rfloor)$. The label l of the new root is chosen randomly with probability $p_{sub}(L(s), l)$. Note that, we require $$\sum_{l} p_{sub}(L(s), l) = 1.$$

To summarize, the generative process $\pi$ is characterized by following parameters $\Theta = (p_{stop}, \{p_{del}(l)\}, \{p_{ins}(l)\}, \{p_{sub}(l_1, l_2)\})$ for $l, l_1, l_2 \in \Sigma$ along with the following conditions:

$$0 < p_{stop} < 1 \quad (3)$$
$$0 \leq p_{del}(l) \leq 1$$
$$p_{ins}(l) \geq 0, \quad \sum_{l} p_{ins}(l) = 1$$
$$p_{sub}(l_1, l_2) \geq 0, \quad \sum_{l_2} p_{sub}(l_1, l_2) = 1$$

Let $P_F(G)$ denote the probability that the process $\pi$ applied to forest F stops and results in forest G. It is easy to show that:
Theorem 1. If $\Theta$ satisfies all the conditions in eq. (3), then $P_F(G)$ is a probability distribution on the set of all forests, i.e.

$$\sum_{G} P_F(G) = 1.$$

For the XML tree edit transducer described in the above section, one important inference problem is to compute $P_S(T) = \Pr[\pi(S) = T]$, i.e., the probability of the current tree S changing into the tree T. We show below that this probability can be computed by dynamic programming.

Let $F_s$ and $F_t$ be subforest of S and T respectively. Let $DP_1(F_s, F_t)$ denote the probability that $\pi(F_s) = F_t$. Let u and v denote the roots of the rightmost trees in $F_t$ and $F_t$ respectively. Note that every node in $F_t$ is either newly created by some $\pi_{ins}$ operator or is the result of a substitution by some $\pi_{sub}$ operator from some node in $F_s$. Let $DP_2(F_s, F_t)$ denote the probability that $\pi(F_s) = F_t$ and v was generated by a substitution under $\pi$.

We next show how to compute $DP_1$ and $DP_2$ recursively. Consider $DP_1(F_s, F_t)$. There are two cases: (i) The node v was the result of an insertion by $\pi_{ins}$ operator. Let p be the probability that $\pi_{ins}$ inserts the node v in $F_t - V$ to form $F_t$. Then, the probability of this case is $DP_1(F_s, F_t - v)*p$. (ii) The node v was the result of a substitution. The probability of this case is $DP_2(F_s, F_t)$. Hence, we have $$DP_1(F_s, F_t) = DP_2(F_s, F_t) + p*DP_1(F_s, F_t - v) \quad (4)$$

Now consider $DP_2(F_s, F_t)$. Again, there are two cases: (i) v was substituted for u. In this case, we must have $F_s - [u]$ transform to $F_t - [v]$ and $\lfloor u \rfloor$ transform to $\lfloor V \rfloor$. Denoting $p_{sub}(label(u), label(v))$ with $p_1$, the total probability of this case is $p_1 * DP_1(F_s, -[u], F_t - [v]) * DP_1(\lfloor u \rfloor, \lfloor v \rfloor)$. (ii) v was substituted for some node other than u. Then, it must be the case that u was deleted. Denoting $p_{del}(label(u))$ with $p_2$, the total probability of this case is $p_2 * DP_2(F_s - u, F_t - v)$. Hence, $$DP_2[F_s, F_t] = \tag{5}$$
$$p_1 DP_1(F_s - [u], F_t - [v]) DP_1(\lfloor u \rfloor, \lfloor v \rfloor) + p_2 DP_2(F_s - u, F_t - v)$$

The functions $DP_1$ and $DP_2$ can be computed using a dynamic programming using Equation (4) and (5). We do not need to compute these functions for all pairs of subforests of S and T. We only need to compute them for special subforests as defined in an article by Zhang and Shasha, who also show that the number of such subforests for a tree T is bounded by $|T|$ min(D(T), L(T)). Thus, we have:

Theorem 2. Given trees S and T, the probability $\Pr[\mu(S)=T]$ can be computed in time $O(|S||T| \min D(S), L(S) \min D(T), L(T))$.

Theorem 2 indicates that the aforementioned operations performed by model learner 304 to generate model 306 are tractable. As noted earlier, archival data 302 can be understood as set of trees which includes an original tree and a number of changed trees that evolved from the original tree. For web documents that have undergone numerous changes over time, the number of possible changed trees may be very large. The number of possible change operation sequences that would lead to such changed trees likewise may be extremely large. Nevertheless, Theorem 2 demonstrates that model learner 304 can determine all possible change operations used to transform an original tree into each of the changed trees in a manageable period of time, even when the number of possible change operations and changed trees is extremely high.

To estimate the parameter $\Theta$ of the transducer from labeled data, we seek to maximize the log-likelihood $l(\Theta)$ $$\Theta^* = \underset{\Theta}{\operatorname{argmax}} \sum_d \log Pr[\pi(S_d) = T_d] \tag{6}$$

where $S_d$ and $T_d$ are a pair of past and present documents. We use simple gradient-based algorithms to optimize the log-likelihood. The gradient with respect to $\Theta$ can be computed also in dynamic programming. The iterative update to $\Theta$ takes the form of $$\Theta \leftarrow \Theta + \eta \frac{\partial l}{\partial \Theta} \tag{7}$$

where $\eta$ is the learning step. Note that $\Theta$ is constrained in eq. (3). We can project the updated $\Theta$ back to the constraints. The update still converges to (local) stationary points.

In addition to developing the model 306 in accordance with the above equations and theorems, the method illustrated in FIGS. 2 and 3 also involves the generation of wrappers 314. Wrapper learner/selector 312 produces wrappers 314, which represent associated paths to a data item in a representation of web document 310. The representation of web document 310 may be in a markup language, such as XML, and/or some other format. Wrappers 314 can be produced in a variety of ways known in the art. For example, wrapper learner/selector 312 can generate "minimal" wrappers 314 using the following technique, which complements model 306 particularly well. One approach to generating minimal wrappers 314 is described below.

We want to consider a set of alternative wrappers 314 for our underlying extraction task and pick the most robust one according to model 306. The previous work on automatically learning XPath rules from labeled webpages works top-down i.e., it starts from the specific paths in each webpage and generalizes them to a single XPath. This results in the most specific XPath, which contains all possible predicates common across all webpage. The resulting XPath is complex and brittle, and not a suitable candidate for a robust wrapper.

In this section, we describe an exemplary algorithm that generates wrappers in a bottom-up fashion, by starting from the most general XPath that matches every node and specializing it till it matches only the target node in each document.

Let D be a set of labelled XML documents, where for each document, a subset of its nodes are labelled. For $D \in D$, let L(D) denote the subset of nodes of D which are labelled. We want to generate XPath expressions W such that for each D, we have W(D)=L(D). Given an XPath W, define $$\operatorname{Precision}(W) = \sum_D (W(D) \cup L(D))/W(D)$$

$$\operatorname{Recall}(W) = \sum_D (W(D) \cup L(D))/L(D)$$

We want to generate XPath expressions that have both precision and recall equal to 1.

Let w be an XPath w. For illustration, we will use the following $w_0$=//table/*/td/text( )

We define a one-step specialization of w to be an XPath obtained by any of the following operations on w:

1. converting a * to a label-name. For instance, $w_0$ can be specialized to
   //table/tr/td/text( )
2. adding a predicate to some node in w. E.g.
   //table[bgcolor='red']/*/td/text( )
3. adding child position information to some node in w. E.g.
   //table/*/td[2]/text( )
4. adding a //* at the top of w. E.g.
   //*/table/*/td[2]/text( )

We say that $W_0 W_1$ if $W_1$ is a one-step specialization of $W_0$ and we say that $W_0 {*} W_1$ if $W_1$ can be obtained from $W_0$ using a sequence of specializations.

The algorithm maintains a set P of partial wrappers. Each element of P is an XPath expressions which has a recall of 1, but precision less than 1. Initially P contains the single XPath "//*" that matches every node. The algorithm repeatedly applies specialization steps to XPaths in P to obtain new XPaths. XPaths are removed from P when their precision reaches 1 and added to the set of output Wrappers.

Given a set of documents D and an XPath W, we say that W is minimal if there is no other XPath $W_0$ such that Precision($W_0$)=Precision(W), Recall($W_0$)=Recall(W) and $W_0 {*} W$. Note that if W is a wrapper, i.e. it has precision and recall 1, and W is not minimal, then we can find a smaller XPath $W_0$ which is also a Wrapper. Since smaller XPaths are less likely to break, we are interested in enumerating all the minimal wrappers. The naive way of obtaining all minimal wrappers is to enumerate all wrappers and discard the ones which are not minimal. Instead, we use the following result to speed up the algorithm.

Lemma 5. Let X be any xpath expression. Let W be a wrapper such that X*W. If W is minimal then X is also minimal.

Using this lemma, we can modify the algorithm to discard non-minimal XPath expressions in the set P after each specialization. The final algorithm for enumerating minimal wrappers is described in Algorithm 1 below:

---
Algorithm 1: ENUMERATE MINIMAL WARPPERS
---
Input: a set of labeled webpages
Output: S, a set of Xpath wrappers
1: S ← Ø
2: P ← { `` // *" } (P is the set of partial wrappers)
3: while P ≠ Ø do
4:    Let W be any xpath in P
5:    P ← P − W
6:    for all $W_0$ s.t. $W_0$ is a specialization of W do
7:        if isMinimal($W_0$) and Recall($W_0$) = 1 and Precision($W_0$) = 1 then
8:            S = S ∪ $W_0$
9:        end if
10:       if isMinimal($W_0$) and Recall($W_0$) = 1 and Precision($W_0$) < 1 then
11:           P = P ∪ $W_0$
12:       end if
13:   end for
14: end while

---

Theorem 3. Algorithm 1 is sound and complete, i.e. it generates all minimal wrappers and only minimal wrappers.

Figure 1:
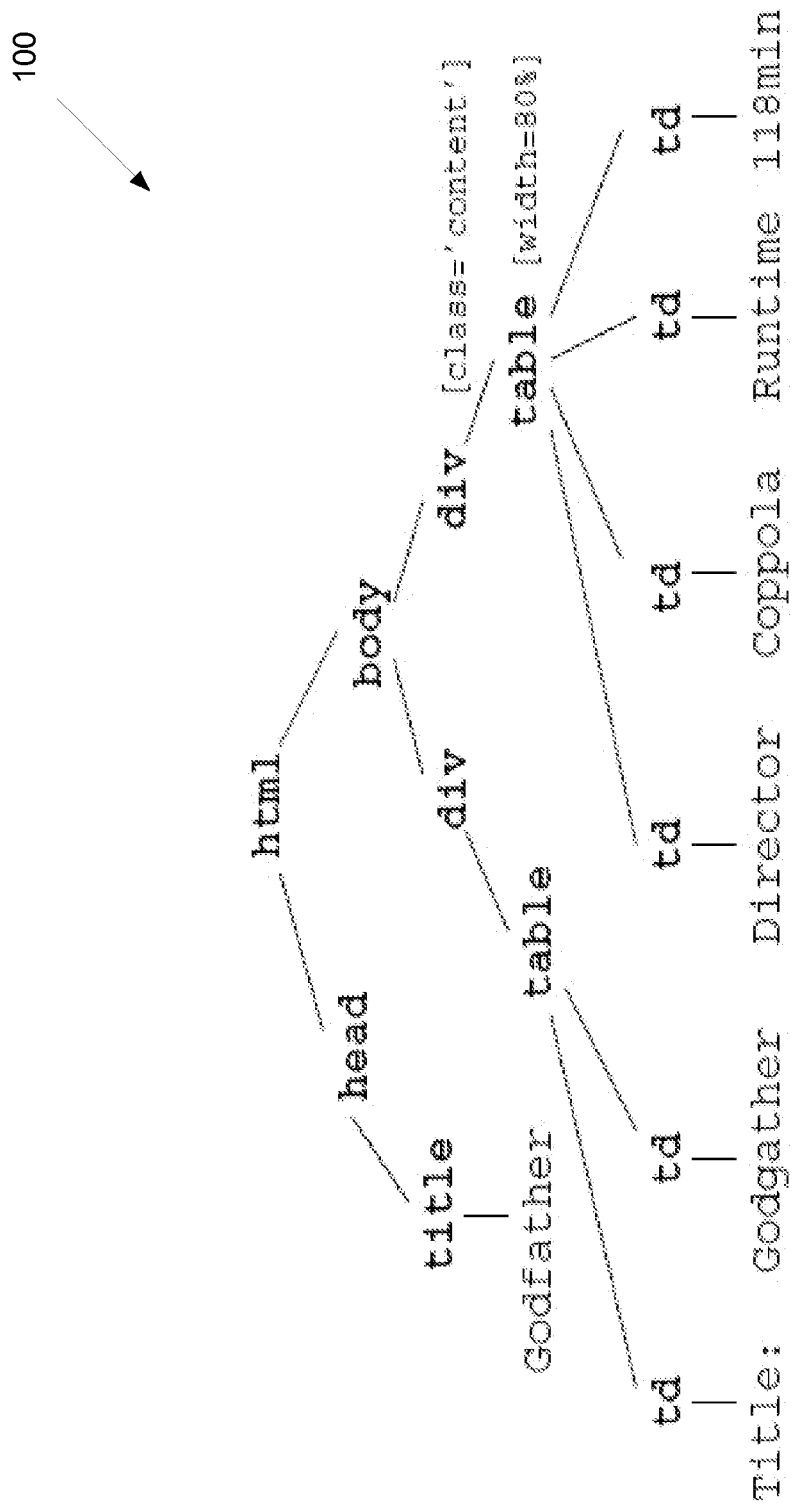
FIG. 1 depicts an exemplary XML document tree.

One of the specialization operations we defined is adding a predicate to a node. We consider two kinds of predicates, [attr=value] and [xpath="text"]. The latter kind of predicates are based on the fact that there are often strong text cues near labeled nodes which can be exploited to generate robust wrappers. For instance, in tree 100 of FIG. 1, the node containing the director names is preceded by a node containing the text "Director:".

We use anchor texts in two steps. In first step, we identify all potential strings in the documents that can serve as anchor texts, where we define potential strings to be texts that appears in all the documents at the same location. Formally, given a node n in a document, let path(n) denote the tag sequence from the root of the document to n. Then, an anchor text is a pair (path, text), such that for each document in the corpus there is a text node n such that the content of n is text and path(n)=path, and we call n an anchor node. We find all the anchor nodes in the documents by a single pass over the corpus and maintaining a hash table of all the candidate anchor texts.

In the specialization step, given a node to add predicate to, we look for anchor nodes near its vicinity in the XML tree and for each such occurrence, we add the predicate [xpath="text"] where xpath is the path used to reach the anchor node from the node under consideration and "text" is the content of the anchor node.

Returning to FIG. 3, in accordance with the aforementioned specialization steps, robustness wrapper learner/selector 312 can generate minimal wrappers 314. Afterward, robustness evaluator 308 uses model 306 to determine robustness characteristics for each of the wrappers 314 (step 206 of FIG. 2).

These robustness characteristics may take a variety of forms, depending on the needs of a particular application. For example, robustness evaluator 308 may determine a success-failure probability for each wrapper. This success-failure probability indicates how effectively a given wrapper locates a data item in a representation of the web document 310, when the web document 310 is changed in accordance with various change operations. As noted earlier, model 306 derives these change operations from the archival data 302 for web document 310.

The determination by robustness evaluator 308 of the success-failure probabilities of wrappers 314 includes several steps. Initially, a process (e.g., the aforementioned process π) can be used to generate N web documents from web document 310. Each one of the N web documents represents the result after a particular sequence of change operations has been applied to web document 310. A particular wrapper 314 is tested against each one of the N web documents i.e., the failure or success of the wrapper path to successfully locate the desired data item in each one of the N web documents is noted. This testing can be repeated for some or all of the wrappers 314.

As a result of such testing, the ability of each one of the tested wrappers to successfully navigate each one of the N web documents is known. As discussed earlier, each one of the N web documents is a result of a particular sequence of change operations and the probability of each one of the change operations taking place is known. As a result, the probability of web document 310 changing into each one of the N web pages can be computed. Using such data, the robustness evaluator 308 can determine the probability that each wrapper will succeed or fail i.e., the success-failure probability.

Afterward, robustness evaluator 308 provides a result wrapper from wrappers 314 that has a desired robustness characteristic (step 208 of FIG. 2.) In the illustrated embodiment, the robustness evaluator 308 simply chooses the wrapper with the best success-failure rate i.e., the wrapper that has the least chance of failure. The nature of the desired robustness characteristic may vary depending on the needs of a particular application.

The various embodiments described above are believed to represent significant advancements over the prior art. Two studies (e.g., Kowalkiewicz and Orlowska; Abe and Hori) experimentally evaluate the robustness of hand-built wrappers by testing them on later versions of the same page. Other work discusses the need for more robust wrappers (e.g., Myllymaki and Jackson; Anton) or in one case for more fragile wrappers (so that change can be detected easily). In general, such work seems to suggest using relative XPaths and normalizing variant tags (for example, changing "b" and "i" tags to "font") (see, e.g., Cohen, Hurst and Jensen.)

Various embodiments of the present invention are related to two bodies of existing work, probabilistic tree transducers and tree edit models. The existing work on probabilistic tree transducers (see, e.g., Bernard, Harbrard and Sebban; Grahl and Knight; Knight and Graehl) appears to focus on machine translation between languages when "non-local" effects are needed. In this case, sentences can be modeled by their parse trees, and probabilistic tree transducers on the parse trees can be trained to translate sentences. Unlike the kinds of trees (e.g., trees that represent a web document) that are contemplated by various embodiments of the present invention, these grammar trees have a small, fixed number of children. Trees that represent web documents, however, can have much more dynamic, complex structures. Such trees, for example, can be multi-tiered structures with numerous nodes, where each node can be a "parent" to very large numbers of "child" nodes, and nodes can be deleted, inserted and/or changed over time.

A number of papers have focused on finding the edit distance, or shortest editing script that changes a source tree to a target tree (see, e.g., Bille). There are also weighted versions of tree edit distances that assign different weights to different edit operations. However, in contrast to particular embodiments of the present invention, these models do not define a probability distribution: they do not compute the probability of a source tree changing to the target tree, but only the shortest/lightest path according to the weights. Similarly, the lack of a probability distribution makes it difficult to define a principled learning component that can learn the weights of various edit operations. As noted earlier, various embodiments of the present invention involve determining a variety of possible change operations, the probability of each change operation and the probability of an original tree becoming a particular changed tree as a result of multiple change operations.

Probabilistic edit models do exist for strings (see, e.g., Ristad and Yianilos; Oncina and Sebban; McCallum, Bellare and Pereira), although apparently such models have been little applied to tree structures (e.g., trees that represent web documents.) Ristad and Yianilos consider a string edit model where the source string is scanned from left to right and at each step, a probabilistic decision is made to either insert a new character, delete the current character or substitute the current character. A key property of this model is that both the source and target strings can be recovered from the edit script. For example, if the edit script is the following sequence of operations:

ins(a), ins(b), sub(d, c), sub(e, f), del(g), ins(h)

then the source string must be deg and target string must be abcfh. As a result, a probability distribution on the set of all edit scripts also induces a probability distribution on the set of all string pairs. While this gives a generative model P(S, T), there is also work on conditional models for strings (see, e.g., McCallum, Bellare and Pereira).

There is a line of work that tries to extend this probabilistic string edit model to trees (see, e.g., Bernard, Habrard and Sebban; Boyer, Habrard and Sebban). However, it incorrectly assumes that even for trees, both the source tree and target tree can be recovered from the edit script. This fails due to the two-dimensional structure of trees. For instance, consider two trees S1 and S2, written in prefix notation as (a(a)(a)) and (a(a(a))) respectively. Thus, S1 is a node with two children and S2 is a path of length 3. Then, the same script, del(a), del(a), del(a) will take both S1 and S2 to the empty tree. Various embodiments of the present invention use a different model that does not depend on such an assumption and successfully accommodates the two-dimensional, multi-tiered structure of web document-based trees.

Evaluating wrapper robustness is complementary to wrapper repair (see [8] and citations). The idea here is generally to use content models of the desired data to learn or repair wrappers. Repair is only effective in some cases where content models are effective, but will not work in general. For example, a content model will not generally be able to distinguish the name of a director from that of an actor with a content model. Wrapper induction techniques focus on finding a small number of wrappers from a few examples (see, e.g., Kushmerick, Weld and Doorenbos; Muslea, Minton and Knoblock). Any of these techniques, whether manual or automatic, can benefit from a robustness metric on the resulting wrappers, especially when it is desirable to learn a wrapper on very few pages leaving the wrapper construction system to choose between a large number of apparently equally good wrappers.

Figure 4:
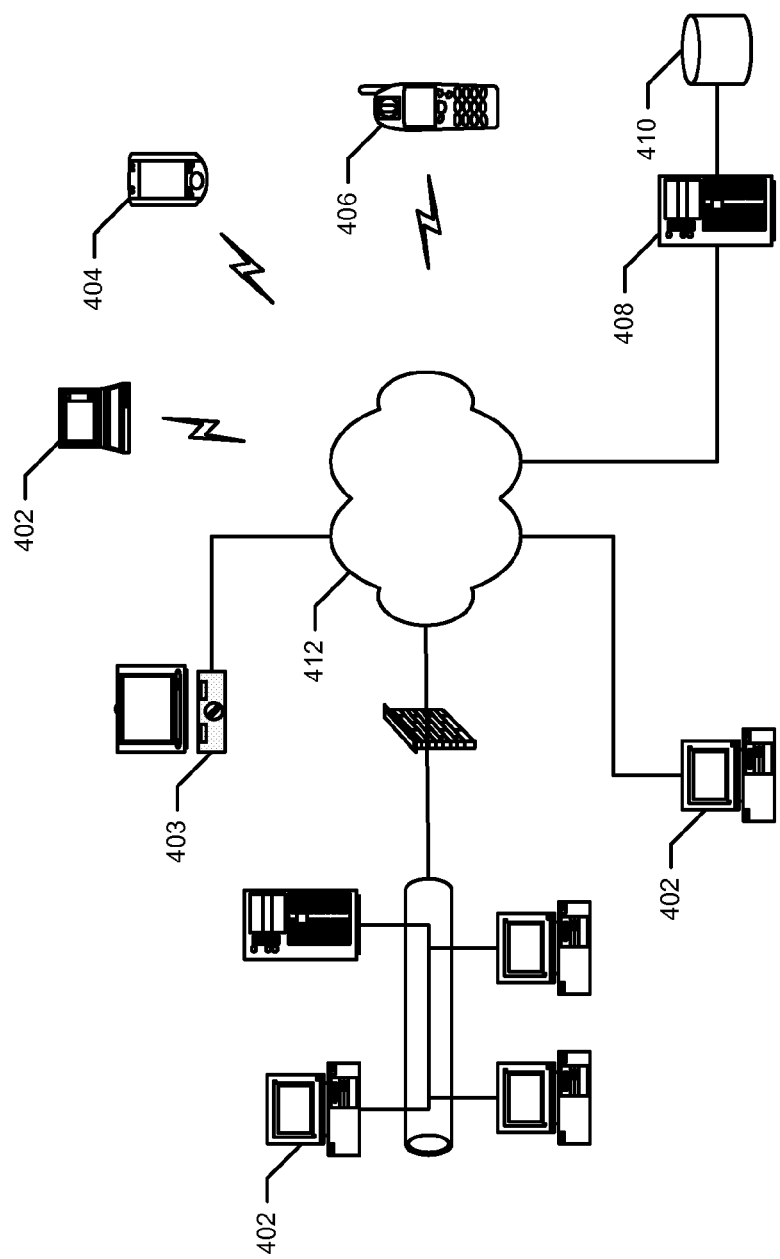
FIG. 4 is a simplified diagram of a network environment in which specific embodiments of the present invention may be implemented.

Embodiments of the present invention may be employed to determine a wrapper with the desired robustness characteristic in any of a wide variety of computing contexts. For example, as illustrated in FIG. 4, implementations are contemplated in which users may interact with a diverse network environment via any type of computer (e.g., desktop, laptop, tablet, etc.) 402, media computing platforms 403 (e.g., cable and satellite set top boxes and digital video recorders), handheld computing devices (e.g., PDAs) 404, cell phones 406, or any other type of computing or communication platform.

According to various embodiments, applications may be executed locally, remotely or a combination of both. The remote aspect is illustrated in FIG. 4 by server 408 and data store 410 which, as will be understood, may correspond to multiple distributed devices and data stores.

The various aspects of the invention may also be practiced in a wide variety of network environments (represented by network 412) including, for example, TCP/IP-based networks, telecommunications networks, wireless networks, etc. In addition, the computer program instructions with which embodiments of the invention are implemented may be stored in any type of computer-readable media, and may be executed according to a variety of computing models including, for example, on a stand-alone computing device, or according to a distributed computing model in which various of the functionalities described herein may be effected or employed at different locations.

Although only a few embodiments of the invention have been described in detail, it should be appreciated that the invention may be implemented in many other forms without departing from the spirit or scope of the invention. Therefore, the present embodiments should be considered as illustrative and not restrictive and the invention is not limited to the details given herein, but may be modified within the scope and equivalents of the appended claims.

The following references are referred to in the description:

M. Abe and M. Hori. Robust pointing by xpath language: Authoring support and empirical evaluation. *Applications and the Internet, IEEE/IPSJ International Symposium on,* 0:156, 2003.

M. Bernard, A. Habrard and M. Sebban. Learning stochastic tree edit distance, In *ECML*, pages 42-53, 2006.

P. Bille, A survey on tree edit distance and related problems. *Theor. Comput. Sci.,* 336(1-3):217-239, 2005.

L. Boyer, A. Habrard and M. Sebban, Learning metrics between tree structured data: Application to image recognition. In *ECML*, pages 54-66, 2007.

W. Cohen, M. Hurst and L. Jensen. A flexible learning system for wrapping tables and lists in html documents. In *WWW '02: Proceedings of the 11th international conference on World Wide Web*, pages 232-241, New York, N.Y., USA, 2002. ACM.

J. Graehl and K. Knight. Training tree transducers. In *HLT-NAACL*, pages 105-112, 2004.

K. Knight and J. Graehl. An overview of probabilistic tree transducers for natural language processing. In *Proceedings of the CICLing,* 2005.

M. Kowalkiewicz, M. Orlowska, T. Kaczmarek, and W. Abramowicz. Robust web content extraction. In *WWW '06: Proceedings of the 15th international conference on World Wide Web*, pages 887-888, New York, N.Y., USA, 2006. ACM.

N. Kushmerick, D. Weld, and R. Doorenbos. Wrapper induction for information extraction. In *IJCAI*, pages 729-737, 1997.

A. McCallum, K. Bellare, and P. Pereira. A conditional random field for discriminatively-trained finite-state string edit distance. In *UAI,* 2005.

I. Muslea, S. Minton, and C. Knoblock. Stalker: Learning extraction rules for semistructured, 1998.

J. Myllymaki and J. Jackson. Robust web data extraction with xml path expressions. Technical report, IBM Research Report RJ 10245, May 2002.

J. Oncina and M. Sebban. Learning stochastic edit distance: Application in handwritten character recognition. *Pattern Recogn.*, 39(9):1575-1587, 2006.

E. Ristad and P. Yianilos. Learning string edit distance. In *ICML*, pages 287-295, 1997.

K. Zhang and D. Shasha. Simple fast algorithms for the editing distance between trees and related problems. *SIAM J. Comput.*, 18(6): 1245-1262, 1989.

What is claimed is:

1. A computer-implemented method to determine a robust wrapper representing a data item of a plurality of data items in a document represented by a markup language, comprising:
   based on archival data representative of a temporal history of the document, developing a model indicative of the temporal history;
   based on the developed model, determining robustness characteristics for a plurality of different wrappers representing associated paths to the data item in a representation of the document, the robustness characteristics for each wrapper representing a likelihood that the corresponding wrapper will continue to be effective for extracting the data item when the document changes; and
   based on a result of the determining operation, providing, as a result wrapper, one of the plurality of wrappers that has a desired robustness characteristic;
   wherein the representation of the document relates to a tree having a plurality of nodes;
   wherein the temporal history of the document relates at least to an original tree and a plurality of changed trees indicative of trees that appeared during the temporal history of the document that are different from the original tree;
   wherein the developing operation includes:
      obtaining a plurality of pairs, each one of the plurality of pairs including a first element (T) and a second element (T'), wherein T is the original tree and T' is a different one of the plurality of changed trees;
      determining a plurality of different change operations indicative of changes made to change T into T' for each one of the plurality of pairs; and
      associating each one of the plurality of different change operations with a probability value indicative of a probability that the associated change operation is applied to the document.

2. The method of claim 1, wherein at least one of the nodes represents a markup language tag.

3. The method of claim 1, wherein the developing operation uses gradient descent.

4. The method of claim 1, wherein the plurality of different change operations includes at least one of a group consisting of: a) removing a node; b) changing a node; and c) inserting a node.

5. The method of claim 1, wherein the determining operation comprises:
   evaluating the plurality of wrappers to determine whether the path associated with each wrapper leads to the data item in the document when the document is changed in accordance with the plurality of different change operations;
   based on a result from the evaluating operation and the probability values associated with the plurality of different change operations, determining a success/failure probability for each one of the wrappers.

6. The method of claim 5, wherein the providing operation is based on comparing the success/failure probabilities of the plurality of wrappers.

7. The method of claim 1, wherein the plurality of different wrappers are minimal wrappers.

8. The method of claim 1, wherein determining includes evaluating the plurality of wrappers to determine whether the path associated with each wrapper leads to the data item in the representation of the document when the document is changed according to various different change operations.

9. The method of claim 8, wherein each of the various different change operations has associated therewith a probability of application of the associated one of the different change operations to the document.

10. A computing system for determining a robust wrapper representing a data item of a plurality of data items in a document represented by a markup language, the computing system comprising one or more computing devices that include one or more processors and memory operable to:
    based on archival data representative of a temporal history of the document, develop a model indicative of the temporal history;
    based on the developed model, determine robustness characteristics for a plurality of different wrappers representing associated paths to the data item in a representation of the document, the robustness characteristics for each wrapper representing a likelihood that the corresponding wrapper will continue to be effective for extracting the data item when the document changes; and
    based on a result from the determination of the robustness characteristics, provide, as a result wrapper, one of the plurality of wrappers that has a desired robustness characteristic;
    wherein the representation of the document relates to a tree having a plurality of nodes;
    wherein the temporal history of the document relates at least to an original tree and a plurality of changed trees indicative of trees that appeared during the temporal history of the document that are different from the original tree;
    wherein the develop operation includes:
       obtain a plurality of pairs, each one of the plurality of pairs including a first element (T) and a second element (T'), wherein T is the original tree and T' is a different one of the plurality of changed trees;
       determine a plurality of different change operations indicative of changes made to change T into T' for each one of the plurality of pairs; and
       associate each one of the plurality of different change operations with a probability value indicative of a probability that the associated change operation is applied to the document.

11. The computing system of claim 10, wherein at least one of the nodes represents a markup language tag.

12. The computing system of claim 10, wherein the computing system is further operable to:
    evaluate the plurality of wrappers to determine whether the path associated with each wrapper leads to the data item in the document when the document is changed in accordance with the plurality of different change operations; and
    based on a result from the evaluation of the plurality of wrappers and the probability values associated with the plurality of different change operations, determine a success/failure probability for each one of the wrappers.

13. The computing system of claim 10, wherein determining includes evaluating the plurality of wrappers to determine whether the path associated with each wrapper leads to the data item in the representation of the document when the document is changed according to various different change operations.

14. The computing system of claim 13, wherein each of the various different change operations has associated therewith a probability of application of the associated one of the different change operations to the document.

15. A non-transitory, computer readable medium embodied in a tangible form including executable computer program code operable to determine a robust wrapper representing a data item of a plurality of data items in a document represented by a markup language, wherein the computer readable medium includes:
  executable computer code operable to develop, based on archival data representative of a temporal history of the document, a model indicative of the temporal history;
  executable computer code operable to determine, based on the developed model, robustness characteristics for a plurality of different wrappers representing associated paths to the data item in a representation of the document, the robustness characteristics for each wrapper representing a likelihood that the corresponding wrapper will continue to be effective for extracting the data item when the document changes, wherein the representation of the document relates to a tree having a plurality of nodes, and wherein the temporal history of the document relates at least to an original tree and a plurality of changed trees indicative of trees that appeared during the temporal history of the document that are different from the original tree; and
  executable computer code operable to provide, based on a result of the determining operation, as a result wrapper, one of the plurality of wrappers that has a desired robustness characteristic;
  wherein the executable computer code operable to develop the model includes:
    executable computer code operable to obtain a plurality of pairs, each one of the plurality of pairs including a first element (T) and a second element (T'), wherein T is the original tree and T' is a different one of the plurality of changed trees;
    executable computer code operable to determine a plurality of different change operations indicative of changes made to change T into T' for each one of the plurality of pairs; and
    executable computer code operable to associate each one of the plurality of different change operations with a probability value indicative of a probability that the associated change operation is applied to the document.

16. The computer readable medium of claim 15, wherein at least one of the nodes represents a markup language tag.

17. The computer readable medium of claim 15, wherein the computer readable medium further includes:
  executable computer code operable to evaluate the plurality of wrappers to determine whether the path associated with each wrapper leads to the data item in the document when the document is changed in accordance with the plurality of different change operations;
  executable computer code operable to determine, based on a result from the evaluation of the plurality of wrappers and the probability values associated with the plurality of different change operations, a success/failure probability for each one of the wrappers.

18. The computer readable medium of claim 15, wherein determining includes evaluating the plurality of wrappers to determine whether the path associated with each wrapper leads to the data item in the representation of the document when the document is changed according to various different change operations.

19. The computer readable medium of claim 18, wherein each of the various different change operations has associated therewith a probability of application of the associated one of the different change operations to the document.

* * * * *